Patented May 3, 1949

2,469,173

UNITED STATES PATENT OFFICE 2,469,173

PROCESS OF SEPARATING DOISYNOLIC ACIDS AND INTERMEDIATES THEREFOR

Karl Miescher, Riehen, and Rudolf Rometsch, Basel, Switzerland, assignors to Ciba Pharmaceutical Products, Inc., Summit, N. J.

No Drawing. Application April 22, 1947, Serial No. 743,194. In Switzerland April 30, 1946

8 Claims. (Cl. 260—473)

The present invention relates to esters of optically active alcohols with acids of the doisynolic type, and to a method for the preparation of such esters in a manner enabling the separation thereof into their pure optical antipodes.

Copending applications, Ser. No. 542,312, filed June 29, 1944, now Patent No. 2,459,834, dated Jan. 25, 1949, and Ser. No. 622,092, filed October 12, 1945, now Patent No. 2,459,949, dated Jan. 25, 1949, disclose processes for the preparation of hydrophenanthrene carboxylic acids and derivatives thereof which, owing to the asymmetrical character of their ring structure, occur in the form of racemic isomers, of which one may possess an especially powerful estrogenic activity. Thus, by the aforesaid processes, it is possible to isolate, among others, two racemic 1-ethyl-2-methyl-7-hydroxy - 1:2:3:4 - tetrahydrophenanthrene-2-carboxylic acids, namely the n- and iso-bisdehydro-doisynolic acids. While for the normal acid the threshold value in the estrus test on rats amounts only to $0.1$–$0.15\gamma$ on oral administration and to $0.1$–$0.2\gamma$ on subcutaneous application, the diastereoisomeric acid has proved to be wholly inactive. The levo-rotary compound corresponding to the racemic n-bisdehydro-doisynolic acid has been prepared by alkaline fusion of d-equilenin [see Heer, Billeter and Miescher, Helvetica Chimica Acta, vol. 28, pages 991–1003 (1945)], and exhibits a threshold value of $0.05$–$0.1\gamma$ on oral administration in the estrus test on rats. This compound is therefore about twice as active as the synthetically prepared racemate and is the most active estrogenic compound hitherto known.

However, no process has hitherto become known which enables racemic acids of the type of doisynolic acid or derivatives thereof to be separated into their pure optical antipodes.

A primary object of the present invention is the preparation of compounds, more particularly esters, of optically active alcohols with acids of the doisynolic type, which compounds are readily separable into their pure optical antipodes.

A further object of the invention is the embodiment of a process whereby racemic acids of the type hereinbefore described may successfully be obtained in the form of the separated pure optical antipodes.

It has been found that the aforesaid objects may be realized by taking advantage of the discovery that when racemic acids of the doisynolic acid type or reactive derivatives thereof, wherein the phenolic hydroxyl group is protected, are subjected to the action of optically active alcohols, the resultant two diastereoisomers are readily separable from each other, so that the esters are thus obtainable in the form of their separated pure optical antipodes. The racemic acids themselves, in the form of their separated pure optical antipodes, may then be produced by treating the aforementioned separated diastereoisomers with agents capable of converting the esterified carboxyl group and/or the protected phenolic hydroxyl group into free carboxyl and hydroxyl groups, respectively.

The phenolic hydroxyl group of the racemic acids, such as n-bisdehydro-doisynolic acid, may be protected, for example, by etherification with methanol, ethanol, a phenol, a benzyl alcohol or the like, or by esterification with an organic or inorganic acid. The starting materials may be prepared, for example, in the manner described in the aforesaid copending applications.

The conversion into the esters in accordance with the invention may be effected with any of the known readily accessible optically active alcohols, such as borneol, terpineol or tetrahydronaphthol, and above all with d- or l-menthol. For example, menthyl esters of racemic n-7-methyl-bisdehydro-doisynolic acid can be obtained by heating the corresponding acid chloride with menthol to 110° C. in a current of nitrogen. However, the same result can be realized by other methods of esterification. The two optically active isomers so formed can be obtained in the pure state by recrystallization. Instead of by systematic crystallizations, complete separation of the diastereoisomeric forms may also be effected by means of chromatographic adsorption methods.

The new esters so obtained may then be treated with agents which convert the esterified carboxyl group and/or the protected phenolic hydroxyl group into a free carboxyl and hydroxyl group, respectively. For this purpose, use may be made of conventional hydrolyzing agents or of pyridine salts or the like. When, for example, it is desired only to hydrolyze the esterified carboxyl group of an ether-ester, use is suitably made of alkaline agents such as a potassium hydroxide melt with propyl alcohol and a low water content. Subsequently or simultaneously, an etherified or esterified phenolic hydroxyl group may also be hydrolyzed. When a benzyl group or the like is to be split off, a reducing agent may equally well be used.

The optically active acids of the doisynolic acid type thus obtained may, if desired, be esterified or etherified at the carboxyl and/or phenolic hydroxyl groups.

The products of the invention are useful for therapeutic purposes or serve as intermediate products for making therapeutically valuable compounds.

The following example illustrates the invention, the parts being by weight unless otherwise stated and the relationship of parts by weight to parts by volume being the same as that of the kilogram to the liter:

*Example*

8 parts of racemic n-7-methyl-bisdehydro-doisynolic acid chloride, that is, the 7-methyl ether of n-bisdehydro-doisynolic acid (obtained, for example, by the action of oxalyl chloride on the methyl ether melting at 228–230° C. of racemic n-bisdehydro-doisynolic acid melting at 204° C.) are heated at 100–110° C. with an equivalent quantity of l-menthol for a few hours in a current of nitrogen. The resulting hydrogen chloride is removed from the reaction mixture by means of the current of nitrogen.

When triturated with methanol the cooled melt crystallizes immediately. It is finely pulverized and washed with a small quantity of methanol in order to remove the excess of menthol. The product is then dissolved in a minimum amount of hot absolute acetone and allowed to crystallize at 20° C. The first fraction of crystals so obtained consists of almost pure (+)-n-7-methyl-bisdehydro-doisynolic acid l-menthyl ester. From the mother liquor there is obtained after concentration to 30 parts by volume a second fraction of crystals of approximately the same composition as the first crystallizate. Both fractions are recrystallized together from absolute acetone. In this manner pure (+)-n-7-methyl-bisdehydro-doisynolic acid l-menthyl ester is obtained melting at 163–164° C. and exhibiting the rotation $[\alpha]_D^{21} = -5 \pm 1°$ (ethyl acetate, $c = 1.18$).

In order to obtain the (−)-n-7-methyl-bisdehydro-doisynolic acid l-menthyl ester, the mother liquor from the second crystallization is evaporated to dryness, and the residue is recrystallized from 450 parts by volume of methanol. There are obtained colorless crystals melting at 112° C. and exhibiting the rotation $[\alpha]_D^{21} = -64 \pm 1.5°$.

The two diastereoisomeric menthyl esters melting at 163–164° C. and 112° C. respectively, may be severally hydrolyzed, for example, by being heated for one hour at 165° C. in a melt containing, for each part of the ester, 2.5 parts of potassium hydroxide and 8 parts by volume of propyl alcohol. No racemization occurs. Also, by starting from extensively concentrated acids obtained by hydrolysis of the not entirely pure menthyl esters, the pure antipodes can be obtained by recrystallizing one to three times from mixtures of methanol and water. The (+)-n-7-methyl-bisdehydro-doisynolic acid and (−)-n-7-methyl-bisdehydro-doisynolic acid so obtained have the following properties:

|  | Dextro-rotary acid | Levo-rotary acid |
| --- | --- | --- |
| Melting pot | 212–220° C | 217–219° C. |
| $[\alpha]_D^{22}$ | +100.5±1.5° (alcohol) | −99.5±1.5° (alcohol). |
| $[\alpha]_{5280}^{22}$ | +138±1.5° (c=1.13) | −135±2.0 (c=0.92). |
| Threshold value | about 15 γ | about 0.05 γ. |

The levo-rotary acid produces no lowering of the melting point in admixture with the methyl ether of the n-bisdehydro-doisynolic acid obtained from d-equilenin by means of a potassium hydroxide melt. It can be converted into the optically active free hydroxy-acid, for example, by heating it with pyridine hydrochloride. The free hydroxy-acid can also be obtained by the direct hydrolysis of the corresponding methoxy-menthyl ester.

Instead of the methyl ether of n-bisdehydro-doisynolic acid, another ether or an ester, such as the acetate or propionate, may be used as starting material.

In an analogous manner it is possible to separate the racemates of 7-hydroxy-1-ethylidene-2-methyl - 1:2:3:4 - tetrahydrophen-anthrene-(2)-carboxylic acid, the 7-hydroxy group of which may be protected by etherification or esterification.

From the resulting acids there may also be obtained esters, for example, the two n-7-methyl-bisdehydro-doisynolic acid methyl esters melting at 107–108° C.

Having thus described the invention, what is claimed is:

1. In a process for the production of the separated pure optical antipodes of optically active compounds, the step of treating a member of the group consisting of a racemic doisynolic acid and reactive derivatives thereof, wherein the phenolic hydroxyl group is protected, with an optically active alicyclic alcohol, whereby a mixture of separable diastereoisomers is produced.

2. A process for the production of the separated pure optical antipodes of optically active esters, which comprises treating a member of the group consisting of a racemic doisynolic acid and reactive acid derivatives thereof, wherein the phenolic hydroxyl group is protected, with an optically active alicyclic alcohol, whereby a mixture of separable diastereoisomeric esters is produced, and separating the said mixture into its component optically active esters.

3. A process for the production of the separated pure optical antipodes of optically active esters, which comprises treating a member of the group consisting of a racemic doisynolic acid and reactive acid derivatives thereof, wherein the phenolic hydroxyl group is protected, with an optically active alicyclic alcohol, whereby a mixture of separable diastereoisomeric esters is produced, and separating the said mixture into its component optically active esters by fractional crystallization.

4. A process for the production of the separated pure optical antipodes of optically active acids, which comprises treating a member of the group consisting of a racemic doisynolic acid and reactive acid derivatives thereof, wherein the phenolic hydroxyl group is protected, with an optically active alicyclic alcohol, whereby a mixture of separable diastereoisomeric esters is produced, separating the said mixture into its component optically active esters, and treating the said esters with a hydrolyzing agent in order to convert the same into the corresponding acids.

5. A process for the production of the separated pure optical antipodes of the optically active menthyl esters of 7-methyl-bisdehydro-doisynolic acid, which comprises treating racemic 7-methyl-bisdehydro-doisynolic acid with optically active menthol, whereby a mixture of separable diastereoisomeric menthyl esters of the said acid is formed, and separating the said mixture into its component optically active esters.

6. A process for the production of the separated pure optical antipodes of the optically active menthyl esters of 7-methyl-bisdehydro-doisynolic acid, which comprises treating racemic 7-methyl-bisdehydro-doisynolic acid chloride with optically active menthol, whereby a mixture of separable diastereoisomeric menthyl esters of the said acid is formed, and separating the said mixture into its component optically active esters.

7. A member of the group consisting of the d- and l-menthyl esters of the lower-alkyl (+)- and (—)-n-bisdehydro-doisynolic acids.

8. A member of the group consisting of the d- and l-methyl esters of the (+)- and (—)-n-7-methyl-bisdehydro-doisynolic acids.

KARL MIESCHER.
RUDOLF ROMETSCH.

No references cited.

Certificate of Correction

Patent No. 2,469,173.   May 3, 1949.

KARL MIESCHER ET AL.

It is hereby certified that errors appear in the printed specification of the above numbered patent requiring correction as follows:

Column 5, line 8, claim 7, before "lower-alkyl" insert the numeral 7; column 6, line 2, claim 8, for "1-methyl" read *1-menthyl*;
and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*